(12) United States Patent
Holt, Jr.

(10) Patent No.: US 6,450,119 B1
(45) Date of Patent: Sep. 17, 2002

(54) SYSTEM FOR HOLDING A PAD

(75) Inventor: Robert C. Holt, Jr., North Canton, OH (US)

(73) Assignee: Coastal Pet Products, Inc., Alliance, OH (US)

( * ) Notice: Subject to any disclaimer, the term of this patent is extended or adjusted under 35 U.S.C. 154(b) by 0 days.

(21) Appl. No.: 09/781,520

(22) Filed: Feb. 12, 2001

(51) Int. Cl.⁷ ................................................ A01K 29/00
(52) U.S. Cl. ..................................................... 119/28.5
(58) Field of Search ............................. 119/28.5, 161, 119/166, 167, 169, 170, 171, 165; 248/346.04

(56) References Cited

U.S. PATENT DOCUMENTS 6,059,247 A    5/2000    Olivadoti ............... 248/346.04

OTHER PUBLICATIONS

Doctors Foster & Smith catalog excerpt, vol. 01–01, 2 pages (2001).
New England Serum Company catalog excerpt, 2 pages (late winter 2001).
Pet Professional Direct catalog excerpt, 2 pages (Fall 2000).

*Primary Examiner*—Charles T. Jordan
*Assistant Examiner*—Judith A. Nelson
(74) *Attorney, Agent, or Firm*—Renner, Kenner, Greive, Bobak, Taylor & Weber

(57) ABSTRACT

A system for holding a pad (P) includes a plurality of corner members (11) including a base portion (13) made of a rigid plastic material and an insert portion (18) made of a resilient material. A frame is formed by interconnecting the corner members (11) with connector members (12). The insert portion (18) is provided with a plurality of cuts (19) which receive and hold the pad (P) near the corners thereof.

21 Claims, 2 Drawing Sheets

SYSTEM FOR HOLDING A PAD

TECHNICAL FIELD

This invention relates to a system for holding a pad, such as a disposable pad which absorbs the urine of a pet. More particularly, this invention relates to such a system which is inexpensive, but which can easily receive and hold a pad or the like.

BACKGROUND ART

Urine-absorbing and deodorizing pads are often used by pet owners to train their pets or to otherwise provide a sanitary location for pets to relieve themselves. Such pads obviously need to be readily disposable and yet be held in position when in use. To that end, trays, somewhat similar to a conventional litter box, have been designed to releasably hold the pads. One such tray, made of a rigid plastic material, includes a bottom surface for resting on the floor with short sidewalls extending upwardly from the periphery of the bottom surface. A disposable pad is positioned on the bottom surface, and its periphery is draped over the top of the sidewalls. A second plastic piece, generally in the configuration of a picture frame, is then positioned on top of the sidewalls to hold the pad in place solely by virtue of the weight of the frame. While removal of the pad for disposal is thus relatively easy with this prior art system, it is not without its potential problems. First, the tray and frame are not inexpensive to manufacture, therefore rendering the system costly to the pet owner. Of even greater significance is the fact that this prior art device does not always securely hold the pad. Because only the weight of the frame is holding the periphery of the pad, if a pet were to scratch on the pad with its claws, it is possible that the periphery of the pad would become disengaged from between the frame and the sidewalls of the tray.

In an attempt to solve this problem, another prior art system utilizes hand manipulated latches to attach the frame to the tray with the periphery of the pad thus being attached therebetween. While solving the potential holding problem of the prior art just described, the addition of the clamps adds significantly to the cost of the system, while at the same time providing a component part which is susceptible to breakage.

In any of the prior art, the systems cannot be disassembled for compact storage when not in use. Therefore, the need exists for a system to securely hold a pad which is easy to use, inexpensive to manufacture and distribute, and which can be disassembled, if desired, for compact storage.

DISCLOSURE OF THE INVENTION

It is thus an object of the present invention to provide a system for holding a pad which is simple and inexpensively manufactured.

It is another object of the present invention to provide a system, as above, which can easily, yet securely, hold the pad, while at the same time permitting the facile release of the pad.

It is a further object of the present invention to provide a system, as above, which can be disassembled, if desired, for compact storage.

These and other objects of the present invention, as well as the advantages thereof over existing prior art forms, which will become apparent from the description to follow, are accomplished by the improvements hereinafter described and claimed.

In general, a system for holding a pad or the like includes a plurality of corner members adapted to releasably hold the pad. A connector member is carried between adjacent corner members. The corner members and the connector members thereby form a frame.

Another aspect of the present invention relates to the combination of a pet training pad and a frame to hold the pad. The frame includes corner members which hold the pad near the corners thereof and a connector member between each corner member.

A preferred exemplary system for holding a pad or the like incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
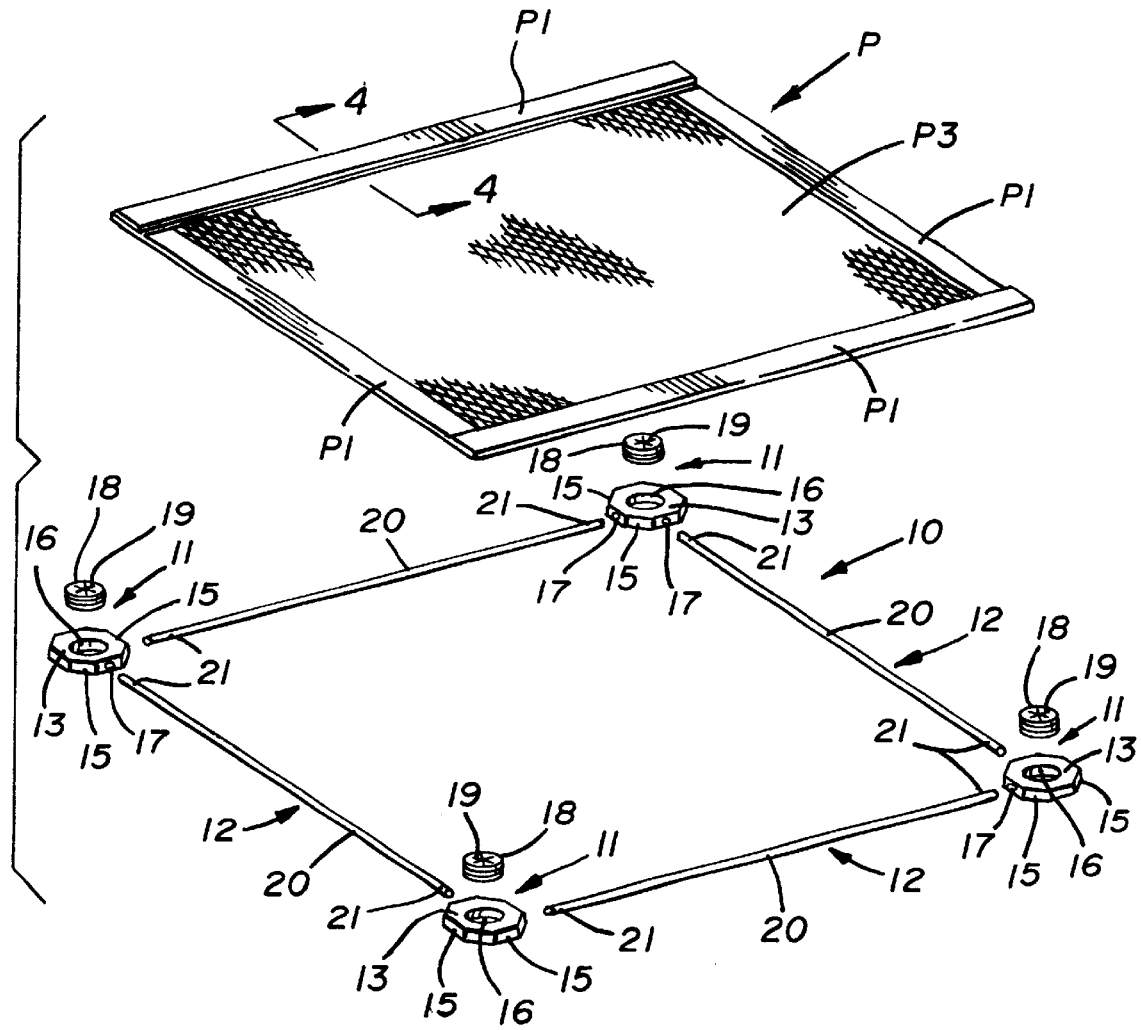
FIG. 1 is an exploded perspective view of the components of a pad holding system made in accordance with the concepts of the present invention.
Figure 4:
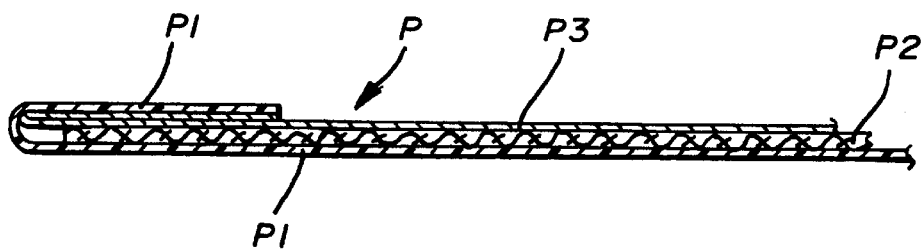
FIG. 4 is a sectional view taken substantially along line 4—4 of FIG. 1.

A system for holding a pad P or the like is generally indicated by the numeral 10 and includes a plurality of corner members, generally indicated by the numeral 11, and a plurality of connector members generally indicated by the numeral 12.

Each corner member 11 includes a base 13 which is preferably formed of a rigid plastic material such as acrylonitrile-butadiene-styrene, polypropylene, nylon or their equivalent. Base 13 is shown as being generally toroidal in configuration having a flat bottom surface 14. Base 13 thus includes external surfaces 15 and an internal, generally circular recess 16. Although base 13 is shown as having eight surfaces 15, thereby being octagonal in configuration, it could take on any other suitable configuration. At least two external surfaces 15, at ninety degrees of each other, and preferably all external surfaces 15, are provided with an aperture 17 therein, to hold, in a manner to be hereinafter described, a connector member 12.

Each corner member 11 also includes an insert 18 preferably made of a resilient material such as polyvinylchloride, a thermoplastic rubber or their equivalent. Insert 18 is shown as being generally circular in configuration and is adapted to be press fit into recess 16 of base 13. Alternatively, base 13 and insert 18 may be molded as one piece using an overmolding process wherein base 13 is still formed of a rigid plastic, and insert 18 is still formed of a resilient material. Insert 18 is provided with a plurality of radially extending scores or cuts 19 in the top thereof which together form an opening to receive the corners of pad P as will hereinafter be described.

Connector members 12 may be in the form of a wire rod 20 or the like. Each end 21 of each rod 20 is adapted to be received in an aperture 17 in base 13 of a corner member 11.

System 10 may be used to hold any type of pad P, but is shown with a pad P especially adapted to be a pet training pad. As such, pad P includes a bottom layer P1 which is impervious to liquid, a middle layer P2 which is urine absorptive, and a top layer P3 which protects the absorbent layer P2 from damage by the pet. Although not part of this invention, middle layer P2 may be chemically treated to assuage the odor of the pet's urine and also may be treated to emit a scent which would attract a pet to the training pad. Layers P1, P2 and P3 are attached to each other at or near their periphery, although preferably, bottom layer P1 is on at least two peripheral edges somewhat larger than layers P2 and P3 and, as shown, is folded back over layers P2 and P3.

System 10 is shown in an exploded or unassembled configuration in FIG. 1. As can readily be seen, in this configuration, the various components thereof can be stored in a relatively small area. To assemble system 10, inserts 18 are positioned into recesses 16 of base 13 unless, of course, as previously described, corner members 11 have been molded as one-piece units. Then the ends 21 of a rod 20 are pressed into apertures 17 of opposed corner members 11 to form one leg of a frame. A second leg is similarly formed, and the two legs are interconnected at their ends by additional rods 20 to form what is shown as a rectangular or square frame consisting of four corner members 11 and four connector members 12. It should be appreciated, however, that system 10 need not be square or rectangular in nature, but rather could be configured to take on generally any geometric shape usually dependent on the shape of the pad to be held thereon, it only being important that there be a corner member 11 between each connector member 12.

Figure 2:
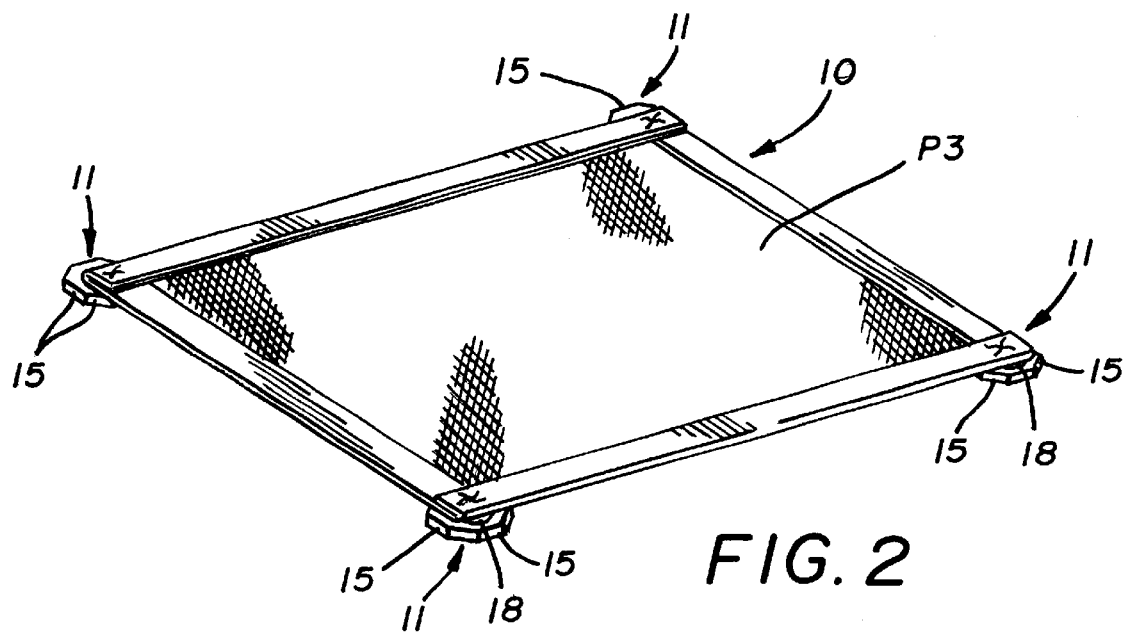
FIG. 2 is a perspective view of an assembled pad holding system made in accordance with the concepts of the present invention.
Figure 3:
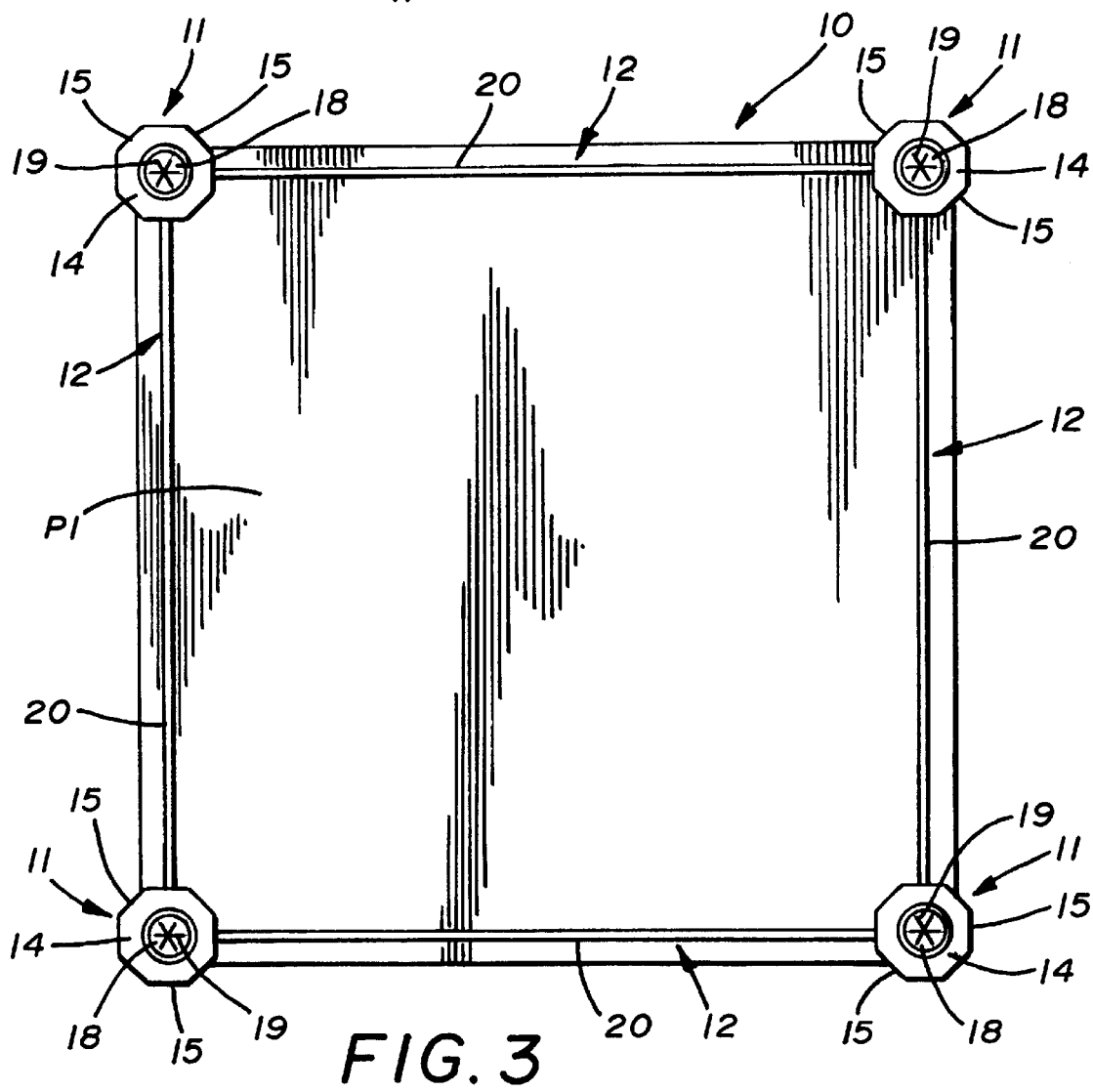
FIG. 3 is a bottom plan view of the system shown in FIG. 2.

Pad P may then be attached to the interconnected corner members 11 by pushing it, near its corners, through the opening formed by cuts 19 in inserts 18 as shown in FIG. 2. The resilient nature of the material of inserts 18 will readily hold pad P in place. The pad P, as held by system 10, may thus be placed on the floor, with system 10 resting on the bottom surfaces 14 of bases 13 of corner members 11. When pad P has served its useful life, its corners may be readily pulled out of the inserts 18 and a new pad installed on system 10. And when a pad is no longer needed for a pet, system 10 may be disassembled, as desired, and stored for future use, as necessary.

It should thus be evident that a pad-holding system as described herein accomplishes the objects of the present invention and otherwise substantially improves the art.

What is claimed is:

1. A system for holding an item comprising a plurality of corner members adapted to releasably engage an item, and a connector member carried between adjacent corner members, said corner members and said connector members thereby forming a frame, said connector members not being adapted to engage an item.

2. A system according to claim 1 wherein at least a portion of each said corner member is made of a resilient material adapted to engage an item.

3. A system according to claim 2 wherein said portion includes a plurality of cuts, a portion of an item being adapted to be received through said cuts.

4. A system according to claim 1 wherein each said corner member includes a base portion adapted to rest on a surface.

5. A system according to claim 4 wherein each said base portion has apertures therein, each said connector member including a rod having ends received in said apertures of adjacent base portions.

6. A system according to claim 4 wherein said base portion includes a recess, and each said corner member including an insert received in said recess.

7. A system according to claim 6 wherein said base portion is made of a rigid material and said insert is made of a resilient material.

8. A system according to claim 7 wherein said insert includes a plurality of radially extending cuts, a portion of an item being adapted to be received through said cuts.

9. In combination, a pet training pad and a frame to hold the pad, the frame including corner members engaging the pad near the corners thereof, and a connector member between each corner member, the pad not being engaged by said connector members.

10. The combination of claim 9 wherein at least a portion of each said corner member is made of a resilient material to hold the pad.

11. The combination of claim 10 wherein said portion includes a plurality of cuts, a portion of the pad being received through said cuts.

12. The combination of claim 9 wherein each said corner member includes a base portion adapted to rest on a surface.

13. The combination of claim 12 wherein each said base portion has apertures therein, each said connector member including a rod having ends received in said apertures of adjacent base portions.

14. The combination of claim 12 wherein said base portion includes a recess, and each said corner member including an insert received in said recess.

15. The combination of claim 14 wherein said base portion is made of a rigid material and said insert is made of a resilient material.

16. The combination of claim 15 wherein said insert includes a plurality of radially extending cuts, a portion of the pad being received through said cuts.

17. The combination of claim 9 wherein the pad includes a bottom layer of liquid-impervious material, a middle layer of a liquid-absorbing material, and a top layer of protective material.

18. The combination of claim 17 wherein said bottom layer is larger than said middle and to players on at least a portion of the periphery thereof.

19. The combination of claim 9, the pad being generally rectangular and the frame being generally rectangular including four corner members and four connector members.

20. The combination of claim 19 wherein each said corner member includes a first portion made of a rigid material and having apertures therein, and a second portion made of a resilient material to hold the pad near the four corners thereof; said connector members being rods having ends received in said apertures of adjacent first portions.

21. In combination, a pet training pad and a frame to hold the pad; the frame including corner members and a connector member between each corner member; each said corner member having a recess, and an insert received in said recess, said insert having cuts therein to engage a portion of the pad.

* * * * *